Patented Feb. 25, 1947

2,416,382

UNITED STATES PATENT OFFICE 2,416,382

PRINTING PROCESS FOR THE FIXATION OF CHROME MORDANT DYESTUFFS

Georges de Niederhäusern and Ernst Tschan, Basel, Switzerland, assignors to the Swiss firm of Durand & Huguenin A. G., Basel, Switzerland No Drawing. Application November 9, 1942, Serial No. 465,092. In Germany November 15, 1941

13 Claims. (Cl. 8—72)

In printing with mordant dyestuffs, especially with chrome mordant dyestuffs, on various fabrics, the fixation was formerly obtained by a steaming of two hours. Later on it was possible to reduce considerably the duration of steaming for most of the chrome mordant dyestuffs, for instance to 10–15 minutes and in many cases even to 4–8 minutes, by means of certain additions to the printing colours, such as for example urea (see British Patent 318,469, and Melliand Textilberichte, Heidelberg, tome XIV, 1933, page 412, "Ueber einige Fortschritte in der Anwendung der Chromfarbstoffe," by G. von Niederhäusern).

It has now been found that the fixation of mordant dyestuffs can be performed by simple drying, without steaming, according to the following working process:

The mordant dyestuff is dissolved in as little water as possible in presence of a suitable solvent, such as for instance ω-ω'-dihydroxydiethylsulphide, monoethylglycol and the like, while adding urea.

This solution is incorporated, whilst stirring continuously, in a nitrocellulose thickener in one of its commercial forms. Thus, there is obtained a transparent coloured mass, to which is added subsequently an aqueous solution of a chromate and an agent splitting off acid in the heat, such as ammonium sulphocyanate, ammonium sulphate, diethyltartrate and the like. The paste thus obtained is printed on the fabric and strongly dried. Surprisingly by this drying process the chrome lake is at once and completely formed in finest dispersion by the chromate and the corresponding mordant dyestuff. The prints thus obtained do not contain any more unaltered mordant dyestuff, i. e., dyestuff which is not in the form of chromium lake; and they prove to be entirely fast to rubbing and soaping. Similar results are obtained when substituting the nitrocellulose thickener by other cellulose ester and cellulose ether thickeners, such as for instance the ethyl cellulose thickener and so on.

It could not be expected that the formation of the chrome lake of the mordant dyestuff in the aforesaid medium (nitrocellulose thickener or other cellulose ester or cellulose ether thickeners)—by a simple drying—would take place much more easily and more rapidly than in the thickenings usually employed for printing colours. In many cases it may be of advantage to heat the cellulose ester or ether thickener before use.

It has already been proposed to dye the nitrocellulose thickener with chrome dyestuffs by introducing the chrome dyestuff as dyestuff or as leuko compound in powder form into the thickener and to add thereto sodium bichromate or another salt of the chromic acid in powder form in order to form the chrome lake of the dyestuff (see French Patent 765,487).

However, it appears that the solubility of the dyestuff powder in the thickener does not suffice for the production of intensively dyed thickeners.

A more recent patent, the German Patent 709,631, relates to a process for the production of metalliferous mono azo dyestuffs which may be used for the dyeing of masses, such as lacquers, resins and coatings made thereof. In this process the metalliferous compounds of the mono azo dyestuffs are prepared separately. Afterwards, these metalliferous compounds are dissolved in the lacquer and the latter is used for producing the coloured coatings. In the said patent only dyestuffs containing no sulpho groups are used.

In contrast with the above mentioned patent, in the present process the metalliferous compounds, that is to say the metallic lakes of the dyestuffs are not formed outside the thickener, but in the thickener itself and this only on the fabric after printing. These metallic lakes are obtained in finest dispersion from a solution. The so-obtained dyeings are distinguished by their great brightness and good yield.

The present process is not limited to dyestuffs containing no sulpho groups. On the contrary, dyestuffs containing sulpho groups are preferred on account of their good solubility in water and other solvents used in the present process.

The new process is illustrated by the following examples, but not limited thereto:

Example 1

The following printing colour is printed on cotton:

| | Parts |
|---|---|
| Chromocitronine R (Colour Index No. 441) | 20 |
| Urea | 80 |
| Monoethylglycol | 40 |
| Water | 80 |
| Nitrocellulose thickener in commercial form | 500 |
| Butyl alcohol | 200 |
| Aqueous solution of ammonium sulphocyanate 1:1 | 40 |
| Aqueous solution of sodium chromate 1:2 | 40 |
| | 1,000 |

The prints are strongly dried, then washed, soaped and finished as usual for chrome colours.

In the course of the drying the chrome lake of the mordant dyestuff contained in the paste is formed. The dyestuff is fixed on the fibre giving shades which are fast to soaping.

*Example 2*

The following printing paste is printed on viscose-rayon:

| | Parts |
|---|---|
| Dyestuff according to Example 1 of the British Patent 255,086 | 10 |
| Urea | 80 |
| ω-ω'-Dihydroxydiethylsulphide | 40 |
| Water | 50 |
| Nitrocellulose thickener in commercial form | 500 |
| Butyl alcohol | 200 |
| Aqueous solution of ammonium sulphate 1:2 | 40 |
| Aqueous solution of sodium chromate 1:2 | 40 |
| | 1,000 |

The printed material is strongly dried, then washed, soaped and finished as usual for chrome colours. By the drying operation the chrome lake of the mordant dyestuff contained in the paste is formed. The dyestuff is fixed on the fibre giving shades which are fast to soaping.

*Example 3*

The following printing colour is printed on natural silk:

| | Parts |
|---|---|
| Eriochromazurol S. (Colour Index No. 720) | 20 |
| Urea | 80 |
| ω-ω'-Dihydroxydiethylsulphide | 40 |
| Water | 80 |
| Nitrocellulose thickener in commercial form | 500 |
| Butyl alcohol | 200 |
| Aqueous solution of ammonium sulphocyanate 1:1 | 40 |
| Aqueous solution of sodium chromate 1:2 | 40 |
| | 1,000 |

Natural silk is printed with this printing colour and dried. In order to obtain the soft touch required for printings on silk, it is necessary to soap, after drying, for 5–10 minutes at 80° C.

*Example 4*

The following printing colour is prepared:

| | Parts |
|---|---|
| Chromorhodine BR (Colour Index No. 762) | 20 |
| Urea | 80 |
| ω-ω'-Dihydroxydiethylsulphide | 40 |
| Water | 80 |
| Nitrocellulose thickener in commercial form | 500 |
| Butyl alcohol | 200 |
| Aqueous solution of ammonium sulphocyanate 1:1 | 40 |
| Aqueous solution of sodium chromate 1:2 | 40 |
| | 1,000 |

With this colour cotton is printed and then dried. In the course of the drying operation the chrome lake of the mordant dyestuff contained in the paste is formed. The dyestuff is fixed on the fibre giving shades which are fast to soaping.

*Example 5*

The following printing colour is prepared:

| | Parts |
|---|---|
| Dyestuff according to Example 2 of the British Patent 349,609 | 20 |
| Urea | 20 |
| ω-ω'-Dihydroxydiethylsulphide | 40 |
| Water | 80 |
| Nitrocellulose thickener in commercial form | 500 |
| Butyl alcohol | 200 |
| Aqueous solution of ammonium sulphocyanate 1:1 | 40 |
| Aqueous solution of sodium chromate 1:2 | 40 |
| | 1,000 |

With this colour cotton is printed and then dried. In the course of the drying operation the chrome lake of the mordant dyestuff contained in the paste is formed. The dyestuff is fixed on the fibre giving shades which are fast to soaping.

*Example 6*

The following printing paste is prepared:

| | Parts |
|---|---|
| Modern Cyanin N (Colour Index No. 884) | 10 |
| Persian berry extract (Colour Index No. 1250) | 10 |
| Water | 80 |
| ω-ω'-Dihydroxydiethylsulphide | 80 |
| Urea | 80 |
| Formic acid 85% | 10 |
| Nitrocellulose thickener in commercial form | 460 |
| Butyl alcohol | 160 |
| Solution of sodium bichromate 10% | 20 |
| Made up the weight with butyl alcohol | 90 |
| | 1,000 |

This paste is printed on viscose and dried, whereby a print of a green shade fast to soaping is obtained.

*Example 7*

The following printing paste is prepared:

| | Parts |
|---|---|
| Modern Royal Blue (Colour Index No. 884) | 20 |
| Water | 80 |
| Urea | 80 |
| Formic acid 85% | 10 |
| ω-ω'-Dihydroxydiethylsulphide | 80 |
| Nitrocellulose thickener in commercial form | 500 |
| Butyl alcohol | 160 |
| Solution of sodium bichromate 10% | 10 |
| Made up the weight with butyl alcohol | 60 |
| | 1,000 |

This paste is printed on cotton and dried. There is obtained a blue print fast to soaping.

Instead of nitrocellulose thickener other cellulose ester thickeners such as for instance ethyl cellulose thickeners may also be used.

What we claim is:

1. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a thickener selected from the group consisting of cellulose ester and cellulose ether thickeners, a salt of chromic acid, and an agent which splits off acid in the heat.

2. A printing paste for printing with a chrome mordant dyestuff, which consists of an intimate admixture of a solution of the chrome mordant dyestuff in the minimum amount of water necessary for complete dissolution thereof, ω-ω'-dihydroxydiethylsulphide, urea, a thickener selected from the group consisting of cellulose ester and cellulose ether thickeners, a salt of chromic acid, and an agent which splits off acid in the heat.

3. A printing paste for printing with a chrome mordant dyestuff, which consists of an intimate admixture of a solution of the chrome mordant dyestuff in the minimum amount of water necessary for complete dissolution thereof, monoethylglycol, urea, a thickener selected from the group consisting of cellulose ester and cellulose ether thickeners, a salt of chromic acid, and an agent which splits off acid in the heat.

4. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a nitrocellulose thickener, a salt of chromic acid, and an agent which splits off acid in the heat.

5. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a thickener selected from the group consisting of cellulose ester and cellulose ether thickeners, sodium chromate, and an agent which splits off acid in the heat.

6. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a thickener selected from the group consisting of cellulose ester and cellulose ether thickeners, sodium bichromate, and an agent which splits off acid in the heat.

7. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a thickener selected from the group consisting of cellulose ester and cellulose ether thickeners, a salt of chromic acid, and an ammonium salt which splits off acid in the heat.

8. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a thickener selected from the group consisting of cellulose ester and cellulose ether thickeners, a salt of chromic acid, and ammonium sulphocyanate.

9. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a thickener selected from the group consisting of cellulose ester and cellulose ether thickeners, a salt of chromic acid, and ammonium sulphate.

10. A printing paste for printing with a chrome mordant dyestuff, which consists of an intimate admixture of a solution of the chrome mordant dyestuff in the minimum amount of water necessary for complete dissolution thereof, an aliphatic polyalcohol, urea, a thickener selected from the group consisting of cellulose ester and cellulose ether thickeners, a salt of chromic acid, and diethyltartrate.

11. A printing paste for printing with a chrome mordant dyestuff, which consists of an intimate admixture of a solution of the chrome mordant dyestuff in the minimum amount of water necessary for complete dissolution thereof, ω-ω'-dihydroxydiethylsulphide, urea, a nitrocellulose thickener, sodium chromate and ammonium sulphocyanate.

12. A process for printing with a chrome mordant dyestuff which consists of printing textile material with a paste according to claim 1, and then subjecting the printed material to a drying process.

13. A process for printing with a chrome mordant dyestuff which consists of printing textile material with a paste according to claim 11, and then subjecting the printed material to a drying process.

GEORGES DE NIEDERHÄUSERN.
ERNST TSCHAN.

REFERENCES CITED

The following references are of record in the file of this patent:

UNITED STATES PATENTS

| Number | Name | Date |
|---|---|---|
| 1,942,774 | Roulet | Jan. 9, 1934 |
| 2,062,898 | Moorhouse | Dec. 1, 1936 |
| 2,118,431 | Gessler (1) | May 24, 1938 |
| 2,118,432 | Gessler (2) | May 24, 1938 |
| 2,232,067 | Hofchen et al. | Feb. 18, 1941 |

FOREIGN PATENTS

| Number | Country | Date |
|---|---|---|
| 318,469 | Durand (British) | Dec. 2, 1930 |